Sept. 23, 1969 D. C. OKEY 3,468,353

DUPLICATING APPARATUS

Filed Dec. 20, 1966 3 Sheets-Sheet 1

INVENTOR

BY Donald C Okey

Richard L. Macneill

Sept. 23, 1969 D. C. OKEY 3,468,353

DUPLICATING APPARATUS

Filed Dec. 20, 1966 3 Sheets-Sheet 2

INVENTOR.

BY Donald C Okey

Richard K. Macneill

DUPLICATING APPARATUS

Filed Dec. 20, 1966 3 Sheets-Sheet 3

INVENTOR

BY Donald C Okey

Richard K. Macneill

United States Patent Office 3,468,353
Patented Sept. 23, 1969

3,468,353

DUPLICATING APPARATUS

Donald C. Okey, 1027 Pearl St., La Jolla, Calif. 92037

Filed Dec. 20, 1966, Ser. No. 602,750
Int. Cl. B27c 5/00; B23c 1/16; B26d 5/08
U.S. Cl. 144—144 2 Claims

ABSTRACT OF THE DISCLOSURE

A surfboard duplicating machine having a first clamping means for clamping a surfboard pattern thereto; a second clamping means for clamping a blank to be shaped to the contour of the surfboard pattern; a pattern distorting means coupled to the surfboard pattern and a blank distorting means coupled to the blank for distorting the natural contour of the blank; cam follower means mounted in slidable and rotatable relationship with the surfboard pattern for allowing the cam follower to come into physical contact with the entire surface area of the surfboard pattern, and a cutting means mounted in slidable and rotatable relationship with said blank and coupled to said cam follower means for cutting said blank according to the movements of the cam follower means thereby resulting in shaping the blank according to the contour and shape of the surfboard pattern.

The present invention relates to a duplicating apparatus and more particularly to a duplicating apparatus for shaping surfboards to conform to an existing surfboard pattern.

According to the invention, a surfboard pattern, which can be an existing surfboard, and a blank to be shaped are clamped in special relationship with a cutting means and a cam follower means. The cutting means and cam follower means are mechanically coupled together as are the clamping means holding the surfboard pattern and the blank. The cam follower means is then moved over the surface of the surfboard pattern which results in the cutting means following an identical contour and rough cutting the blank to be shaped along the contour of the surfboard pattern. The surfboard pattern and the blank to be shaped are in slideable and rotatable relationship with the cam follower means and the cutting means to facilitate easy access to the entire surface area of the surfboard pattern and the blank being shaped. A unique method of clamping and bracing the blank to be shaped and the surfboard pattern forms a very important portion of the invention as will be further explained below.

An object of the present invention is a provision of a method and apparatus for shaping a surfboard in which a pattern is utilized for determining the contour of the board to be shaped.

Another object is to provide a method and apparatus for shaping surfboards which requires a minimum of skill on the part of the operator.

A further object of the invention is the provision of a method and apparatus for the shaping of surfboards which is extremely rapid and accurate.

Still another object is to provide a method and apparatus for the shaping of surfboards which is simple, reliable, and requires a minimum of maintenance.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
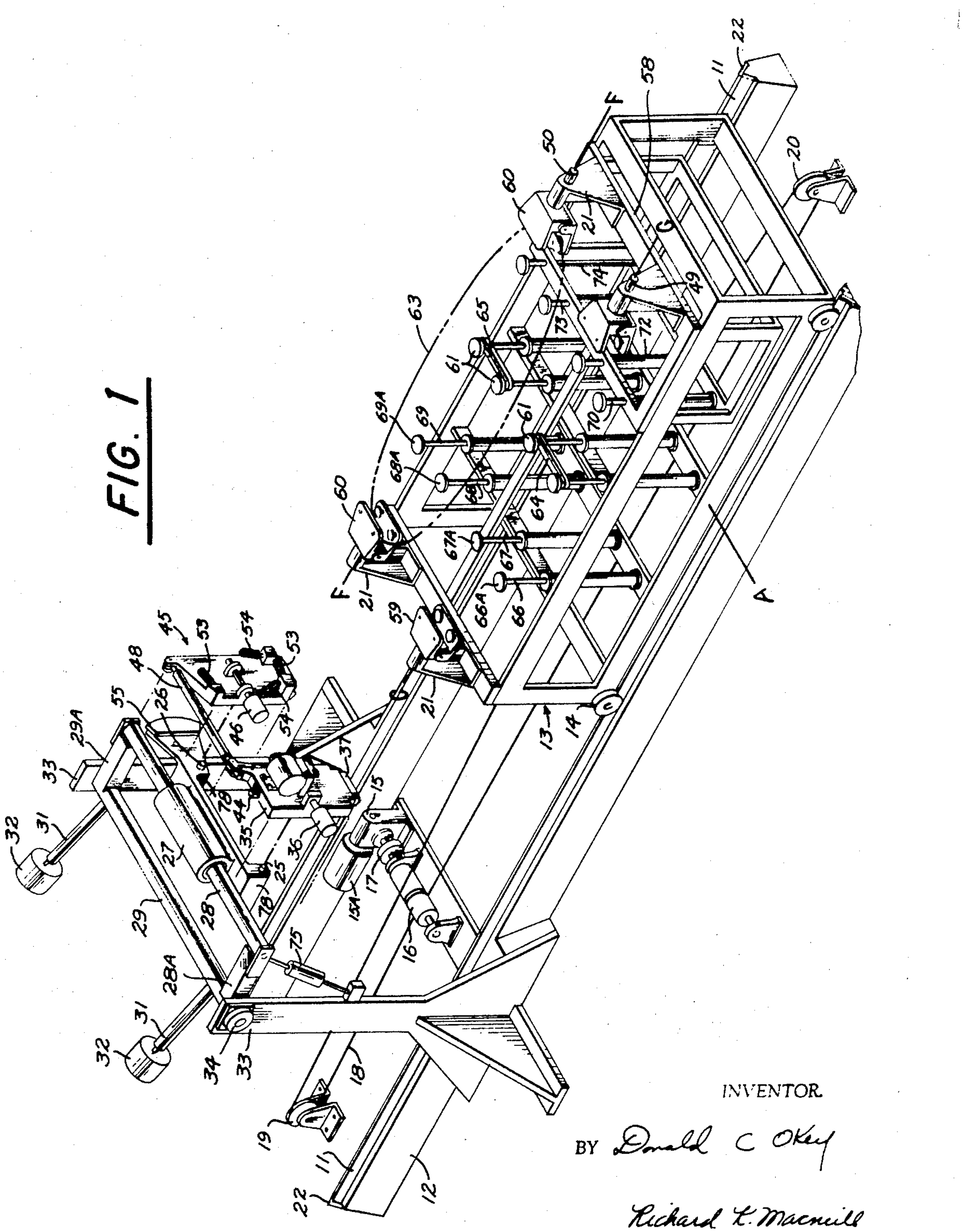
FIG. 1 is a perspective view of the preferred embodiment of the present invention.
Figure 2:
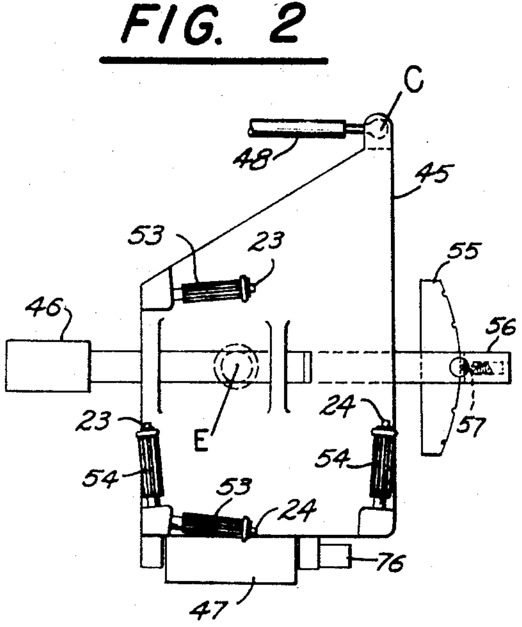
FIG. 2 is a front elevation view of the follower mechanism of FIG. 1.
Figure 3:
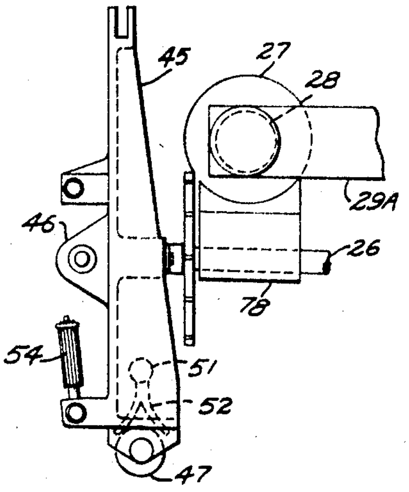
FIG. 3 is a side elevation view of the follower mechanism of FIG. 1.
Figure 4:
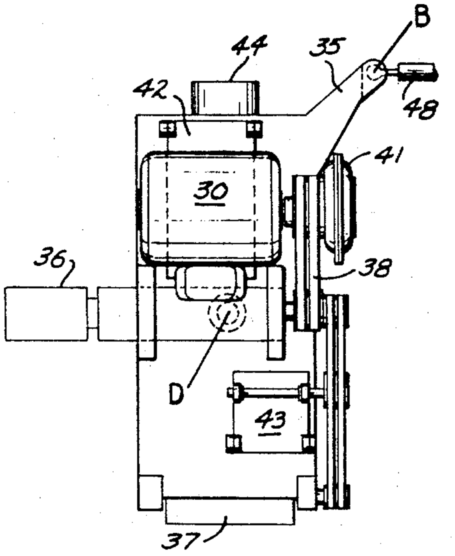
FIG. 4 is a front elevation view of the cutter mechanism of FIG. 1.
Figure 5:
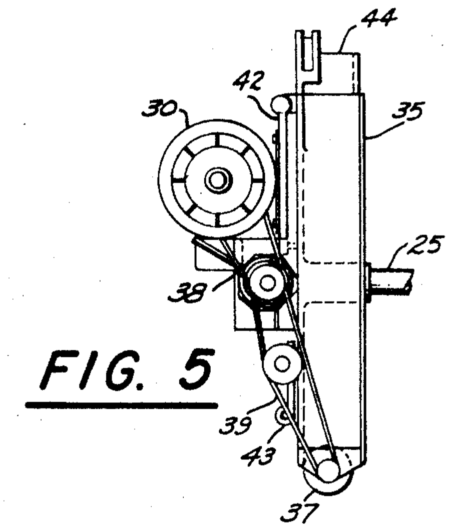
FIG. 5 is a side elevation view of the cutter mechanism of FIG. 1.

Referring to FIGS. 1–5, two inverted V rails 11 mounted on a suitable concrete base 12 are level and parallel. A car 13 is mounted on the rails by four casters 14. These allow car 13 to travel back and forth on V rails 11. The top of the car is also in a level plane. To drive the car back and forth, a motor 15A and reduction gear 15 are provided. The motor 15A is a reversible DC type with speed and torque control and dynamic braking. This is coupled to drum 16 mounted on suitable bearings through torque limiter 17. Cable 18 makes several turns around drum 16 with its ends passed through pulleys 19 and 20 and is attached to car 13 at point A. The length of car 13 is about two feet longer than the longest surfboard to be shaped and the V rails 11 are about twice as long as the car 13. Stops 22 are located at each end of the V rails 11. When casters 14 hit stops 22 a torque limiter 17 will slip. Motor 15A is energized by momentary contact push button switches 23 and 24. These are actuated by the machine operator.

Cutter head 35 and pattern follower head 45 are allowed to revolve in the same or parallel planes on shafts 25 and 26 respectively. Shafts 25 and 26 go through bearing 78 which is attached to ball bearing housing 27. Ball bearing housing 27 runs back and forth on shaft 28. This motion is perpendicular to V rails 11. Two flats and two grooves are provided on shaft 28 for the ball bearings so that ball bearing housing 27 cannot rotate about the axis of shaft 28. Shaft 28 is attached to shaft 29 by two arms 28A and 29A. Shaft 28 is parallel to shaft 29 and both are always in a level position along their axis and are perpendicular to V rails 11. Shaft 29 acts as a fulcrum about which shaft 28 may rotate up and down in an arc about the center line of shaft 29. Two arms 31 support two counterweights 32. The counterweights 32 may be adjusted to balance the load around shaft 29. Shaft 29 is mounted to supports 33 through bearings 34.

The cutting head 35 is attached to shaft 25 and has a first cutter 36 and a second cutter 37. These are similar to a standard jointer cutter used in the woodworking trade and may have two or more blades. The blades may have various contour shapes, although straight blades have been found to have certain advantages. Cutting heads 36 and 37 are driven through V belts 38 and 39 by motor 30 through centrifugal clutch 41. The cutting heads are mounted on suitable bearings and take-ups 42 and 43 are provided for the V belts. Motor 30 has a remote off and on push button switch. Cutting head 35 is enclosed so that it serves as a duct, and fitting 44 is provided for a suitable vacuum source to remove chips and shavings from the horizontal cutting head 37.

The pattern following head 45 is attached to shaft 26 and has a first following head 46 and a second following head 47. These are preferably made of aluminum and provided with detents for easy removal and replacement.

The cutting heads and the following heads will always have the same relative position with respect to the center lines of the material clamp shafts 49 and the pattern clamp shafts 50. As castings 35 and 45 rotate in the same plane, their relative position is assured by tie rod 48, which forms a parallelogram BCDE. The distance BC at the end of tie rod 48 is equal to the distance DE which represents the centers of the shafts 25 and 26 and is also equal to GF which is the distance apart of the clamp shafts 49 and 50.

The followers 46 and 47 and cutters 36 and 37 are the same respective shape. The followers may be different relative sizes so that the cut can be made the same or over or under the pattern. Changing the following heads offer several possibilities. Followers 46 and 47 have suitable bearings so that they may rotate. Second follower 47 has mounted near it a manual valve 51 and jets 52 provided with a suitable air supply to keep chips from getting between pattern 63 and follower 47. Casting 45 has handles 53 for the vertical cut and handles 54 for the horizontal cut. These handles have switches 23 and 24 provided in their tips which are operated by the operator as he is following the pattern. This controls the movement of the car and moves the pattern 63 and the material to be cut 62 back and forth past cutters 36 and 37 and followers 46 and 47. Casting 45 is held in the horizontal position and at equal angles to each side of the horizontal by means of grooves in quadrant 55 which is attached to ball bearing housing 27. Arm 56 is attached to castings 45 and has a spring-loaded pin 57 that fits in the grooves of quadrant 55 forming a predetermined detented position for horizontal follower 47 and cutting head 37.

Car 13 has two bearing posts 57 which are mounted to frame 58. Frame 58 is constructed to slide back and forth parallely to the V rails 11. This allows the distance between the bearing posts to be adjusted for various length patterns and material. Clamp shaft 49 and 50 have clamps 59 and 60 attached thereto. The clamps are attached to the material to be shaped 62 and the pattern 63 at each end (H and I). Points H and I are along their center lines when viewing their plans. H and I correspond in a manner that there is always material to be cut from the top and bottom of 62 when follower 47 is next to the pattern 63. With H and I along the clamp shaft 49 and 50, both the material 62 and pattern 63 may be rotated 180° together so that their respective tops and bottoms may be cut.

Center jacks 64 and 65 are attached to car 13 having pads 61 always in a level plane. These are mounted approximate halfway between H and I. They may be of the screw type or operated hydraulically by other suitable means. Their pads are also centered an equal distance on each side of the clamp shaft. After the material to be shaped 62 and the pattern 63 are clamped on the ends by 59 and 60, their two bottoms are rotated to the up position. Center jack 64 is raised until suitable tension is put on the flexible material to be shaped 62. This tension will cause material 62 to be held rigidly in position. Center jack 65 is then raised under pattern 63. Individual jacks 66, 67, 68 and 69 supporting swivel pads 66A, 67A, 68A and 69A, respectively, are mounted on car 13 and are raised with enough tension to support material 62 and pattern 63 near the clamps but without enough tension to move them from their clamped position. Individual jacks 70, 72, 73 and 74 are mounted in sliding frame 13 and are raised with enough tension to support material 62 and pattern 63 near clamps 66 but without enough tension to move material 62 or pattern 63 from their clamped position. These jacks may be mechanical or hydraulic and manually or remotely operated.

The depth of cut at the center jack position can then be regulated by the relative heights of the material to be shaped 62 and the pattern 63. Since both the material to be shaped 62 and the pattern 63 are held at their ends and forced out of shape at one point at the center jacks, they will both assume a faired but unnatural position. After the bottom is shaped, it is allowed to return to its natural shape, turned over, and a similar operation is done to the top of the board. The result on the shaped material may or may not be like the natural pattern, but it will always be a faired surface. Such a method offers a wide variety of shapes from the same pattern and also makes the methods quite different from a straight duplicating machine. Also the thickness of the material to be shaped 62 can be less than pattern 63. This would not be possible if a straight duplicating method were used.

Figure 6:
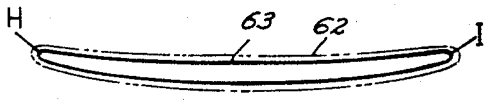
FIGS. 6–8 illustrate a side elevation of the various mounted positions available (schematic) of a blank to be shaped and/or a surfboard pattern.

Referring to FIG. 6, a side elevation is shown of a blank to be shaped 62 and a surfboard pattern 63 in their natural or undistorted shapes.

Figure 7:
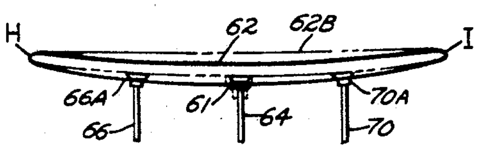

Referring to FIG. 7, clamps 64 have altered the natural position of surfboard pattern 62 to a position shown at 62B with dotted lines.

Figure 8:
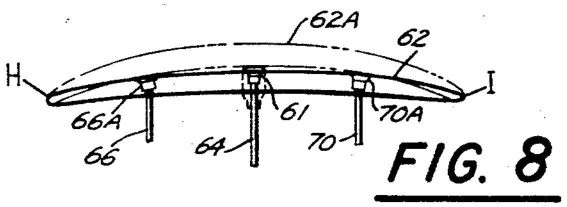

Referring to FIG. 8, clamps 64 have further distorted surfboard pattern 62 to the position shown in dotted lines 62A.

Figure 9:
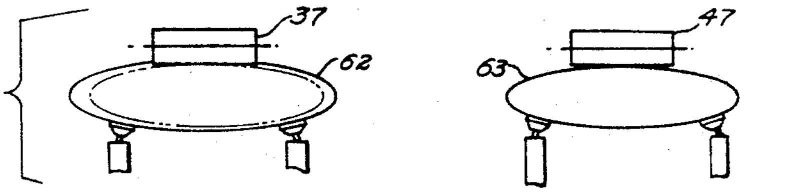
FIGS. 9–14 illustrate a blank to be shaped and a surfboard pattern during various phases of the shaping operation according to the present invention.
Figure 10:
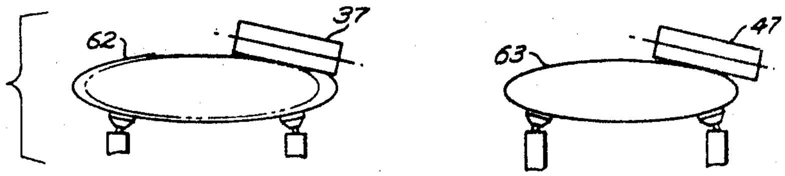
Figure 11:
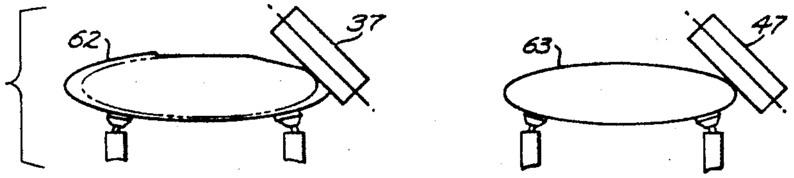

Referring to FIGS. 9, 10 and 11, cam follower 47 is shown in various positions traveling across the top surface of sulfboard pattern 63. Cutter 37 indicated as being coupled by dotted lines to cam follower 47 is shown removing material from surfboard blank 62 in various cutting positions. Surfboard pattern 63 is held by clamps 60 and surfboard blank 62 is held by clamps 59. The dotted lines on surfboard blank 62 indicate the final desired shape of blank 62.

Figure 12:
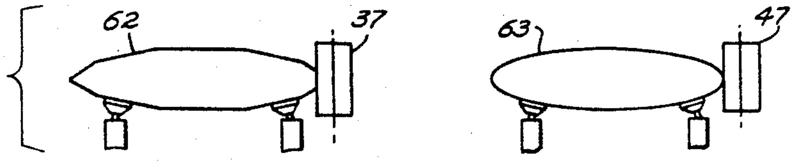
Figure 13:
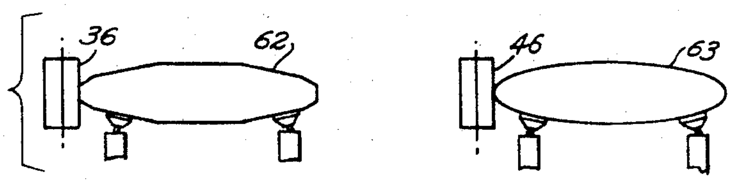

Referring to FIGS. 12, 13, cam follower 46 is shown following the contour of surfboard pattern 63 on each edge thereof with cutter 36 being mechanically coupled thereto as indicated by dotted lines cutting the edges of surfboard blank 62.

Figure 14:
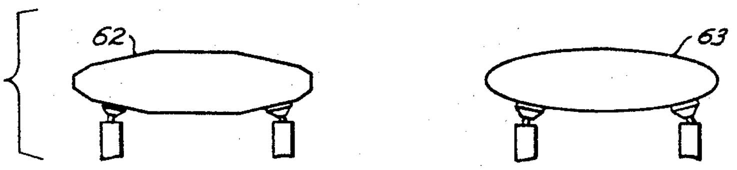

Referring to FIG. 14, the surfboard blank 62 is shown after the shaping operation is completed ready for final finishing prior to further processing.

I claim:

1. A duplicating apparatus comprising:
- a first clamping means for clamping a three dimensional pattern to be duplicated;
- a second clamping means for clamping a blank to be shaped to the contour of said pattern;
- distorting means coupled to said blank for distorting the natural contour thereof;
- cam follower means, said cam follower means and said pattern being mounted in slidable and rotatable relationship to each other for allowing said cam follower means to come in physical contact with the entire surface area of said pattern; and
- cutting means, said cutting means and said blank being mounted in slidable and rotatable relationship to each other for allowing said cutting means to shape the entire surface area of said blank, said cam follower means and said cutting means being mechanically coupled whereby said cutting means follows said cam follower means in movements in any direction.

2. The duplicating apparatus of claim 1 and further including:
- second distorting means coupled to said pattern for distorting the natural contours of said pattern.

References Cited

UNITED STATES PATENTS

| | | | |
|---|---|---|---|
| 494,771 | 4/1893 | Austin | 144—144 |
| 1,883,667 | 10/1932 | Flynn | 144—144 X |
| 2,361,820 | 10/1944 | Cromwell | 144—144 |
| 2,666,464 | 1/1954 | Spencer | 144—144 X |

DONALD R. SCHRAN, Primary Examiner

U.S. Cl. X.R.

83—565, 176; 90—13